United States Patent Office 3,575,912
Patented Apr. 20, 1971

3,575,912
SHORT STOPPING SYNTHETIC RUBBER POLYMERIZATION WITH HYDROQUINONE TERTIARY AMINE OXIDE COMPOUND
Harry Elmer Albert, Lafayette Hill, Pa., assignor to Pennwalt Corporation
No Drawing. Filed May 22, 1968, Ser. No. 731,274
Int. Cl. C08d 1/09, 1/36
U.S. Cl. 260—29.7
9 Claims

ABSTRACT OF THE DISCLOSURE

A process for short-stopping polymerizations, particularly polymerization processes for making synthetic rubber latices such as butadiene-styrene copolymers, where the short-stopping agent is a hydroquinone tertiary amine oxide of the structure

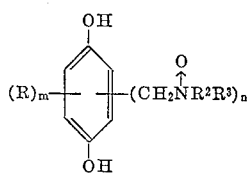

where R is an alkyl radical, chlorine, bromine, nitro or a —(CH$_2$NR$^2$R$^3$) group; $m$ is 0 or 1; R$^2$ and R$^3$ are alkyl radicals, β-hydroxyalkyl radicals, or oxydiethylene when taken together; and $n$ is 1 or 2.

---

This invention relates to an improved process for short-stopping polymerization processes involving ethylenically unsaturated monomers and deals particularly with short-stopping those polymerization processes for making synthetic rubber latices. The short-stopping agent embodied in this invention is a specifically defined hydroquinone tertiary amine oxide compound.

Synthetic rubber latices are prepared commercially by emulsion polymerization of rubber forming monomers wherein the polymerization must be stopped at a certain conversion to get a product of the desired optimum characteristics. Much study has been made toward finding good short-stops and numerous compounds have been found quite useful. However, the compounds used heretofore have certain disadvantages and are not generally satisfactory with all types of polymerization systems. Hydroquinone, for example, has been used in hot butadiene-styrene systems, but it is not satisfactory as a short-stop in cold rubber polymerization processes where a more powerful initiator, as for example, a hydroperoxide, is used. Dinitro-chlorobenzene has been used in cold rubber processes, but it has the severe disadvantage of causing discoloration of the rubber and it is quite toxic to workers in the plant. Alkali metal salts, such as the sodium salts of dithiocarbamates, and particularly sodium dimethyldithiocarbamate, have been used quite successfully in both hot and cold polymerization recipes, but such compounds have the disadvantage of causing some polymer discoloration and of being oxidized to a thiuram disulfide which remains in the finished rubber and causes undesirable and uncontrollable variation in vulcanization rate. Sodium dimethyldithiocarbamate has also been used in combination with sodium polysulfide but this stopping agent combination also has many disadvantages such as line plugging due to sulfur precipitation, and the combination also causes equipment corrosion and discoloration of the polymer product.

It has now been found that an extremely desirable stopping agent for both hot and cold emulsion polymerization systems is obtained by employing as stopping agent a hydroquinone amine oxide having the structure

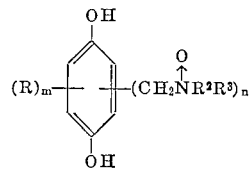

where R is selected from the class consisting of alkyl radicals having one to five carbon atoms, chlorine, bromine, nitro and the group —(CH$_2$NR$^2$R$^3$); $m$ is 0 or 1; R$^2$ and R$^3$ are selected from the group consisting of alkyl radicals having one to five carbon atoms, β-hydroxyalkyl radicals having one to five carbon atoms, and oxydiethylene when R$^2$ and R$^3$ together form a single radical; and $n$ is 1 or 2.

Representative of the preferred compounds useful in this invention are:

2,5-bis(diethylaminomethyl)hydroquinone-N,N'-dioxide
2,5-bis(di-n-butylaminomethyl)hydroquinone-N,N'-dioxide
2,5-bis(dimethylaminomethyl)hydroquinone-N,N'-dioxide
2-dimethylaminomethyl-5-t-butylhydroquinone-N-oxide
2-morpholinomethylhydroquinone-N-oxide
2,5-bis(morpholinomethyl)hydroquinone-N,N'-dioxide
2,5-bis(N-ethyl-N-β-hydroxyethylaminomethyl) hydroquinone-N,N'-dioxide
2,5-bis(N,N-di-β-hydroxyethylaminomethyl)hydroquinone-N,N'-dioxide
2,5-bis(dimethylaminomethyl)hydroquinone-N-oxide
2,5-bis(morpholinomethyl)hydroquinone-N-oxide
2,5-bis(dimethylaminomethyl)-3-methylhydroquinone-N,N'-dioxide
2,5-bis(diethylaminomethyl)-3-chlorohydroquinone-N,N'-dioxide
2,5-bis(dimethylaminomethyl)-3-bromohydroquinone-N,N'-dioxide
2,5-bis(dimethylaminomethyl)-3-nitrohydroquinone-N,N'-dioxide Also useful are the equivalent water-soluble salts of the aforedescribed compounds such as the oxalate, acetate, maleate, phthalate, benzoate, glycolate salts and the like. The salts are sometimes advantageous because of their greater solubility in aqueous latex media.

The hydroquinone tertiary amine oxides embodied in this invention are prepared by the oxidation of the corresponding precursor amine, which tertiary amino hydroquinone precursor is readily obtained by the well-known Mannich reaction involving the reaction of hydroquinone starting material with a secondary amine and formaldehyde. Such methods of preparing the amines are described by J. H. Buckhalter et al., J. Am. Chem. Soc. 68, pg. 1894 (1946); W. T. Caldwell et al., J. Am. Chem. Soc. 61 p. 765 (1939); W. J. Burke et al., J. Org. Chem. 27 pg. 4003 (1962); C. Weatherbee et al., J. Org. Chem. 21, pg. 1138 (1956); D. L. Fields et al.; J. Org. Chem. 29, (9) pg. 2640 (1964). The oxidation of the amines to prepare the amine oxide embodied herein is accomplished with hydrogen peroxide in acetone or methanol solution as described by H. A. Bruson and R. F. McCleary in U.S. 2,220,835.

The short-stopping agents embodied in this invention are stable, white solid materials which are thus readily prepared and easily handled. Their use does not cause any discoloration of the latex to which they are added and does not discolor the dry rubber isolated from the latex by standard coagulation and drying methods. The amine oxides of this invention are surprisingly much more active as stopping agents than the corresponding tertiary amines from which they are derived. The amine oxides also have improved water solubility compared to the parent tertiary amines which facilitates their use in latex media. They are non-ionic in nature and have no tendency to cause undesirable coagulation of the latex when they are added.

In carrying out the process of the invention, conventional polymerization recipes will be employed and the short-stop will be added in the usual manner. Hot synthetic rubber recipes (persulfate or azonitrile initiated) or cold synthetic rubber recipes( hydroperoxide initiated) may be used. The polymerizable material for preparing synthetic rubber latices may be, as is well known, any one or more conjugated diolefins or their admixture with a copolymerizable monoolefin. The conjugated diolefins are exemplified by the butadienes such as butadiene-1,3, isoprene, chloroprene, cyanobutadiene-1,3, 2-phenylbutadiene, piperylene, 2,3-dimethylbutadiene-1,3, and the like. The copolymerizable monomer, which will normally comprise up to about 70% of the mixture, will be a monoolefin containing a single

group having at least one of the free valence bonds attached to an electronegative group. Such olefins include aryl olefins such as styrene, vinyl naphthalene, α-methylstyrene, p-chlorostyrene, etc.; the α-methylene carboxylic acids and their esters, amides and nitriles such as acrylic acid, methacrylic acid, acrylonitrile, methacrylamide, and the like. Thus, the synthetic rubber may be any butadiene polymer latex. However, it will be understood that the short-stopping agent may also be used in accord with this invention to stop polymerization of other ethylenically unsaturated monomers which yield non-elastomeric latices. Thus, this invention may also be used in the polymerization of vinyl and vinylidene halides (e.g., vinyl chloride, vinylidene fluoride, etc.), acrylates, methacrylates and acrylamides (methyl acrylate, glycidyl methacrylate, methacrylamide, etc.), vinyl esters (e.g., vinyl acetate, etc.), and in fact in any addition polymerization system where polymerization proceeds through a free radical mechanism.

The amount of short-stop that will be used will vary from about 0.01 to 2.0 p.h.m. (parts per hundred parts of monomer) with about 0.05 to about 0.2 p.h.m. being preferred. The manner by which the short-stop will be added will be in accord with conventional techniques used in rubber polymerization processes. Preferably an aqueous solution of the short-stop will be added to the polymerization reaction mass when the desired conversion is obtained.

In order to further illustrate the invention, comparative tests are described in the following paragraphs. These test evaluations are carried out by using an emulsion polymerization system contained in capped 7 oz. beverage bottles agitated by being turned end over end in a constant temperature bath by means of a rotating shaft. The test recipe was a standard styrene-butadiene rubber recipe having the following composition:

| Ingredients: | Parts by weight |
|---|---|
| Butadiene | 18 |
| Styrene | 7 |
| Deionized water | 50 |
| Dodecyl mercaptan | 0.058 |
| Potassium salt of disproportionated rosin acids ("Dresinate" 515) | 1.125 |
| Sodium salt of polymerized alkyl naphthalene sulfonate ("Daxad" 11) | 0.038 |
| Tetrasodium salt of ethylene diamine tetraacetic acid sequestering agent ("Versene" 100) | 0.008 |
| p-Menthane hydroperoxide | 0.011 |
| $Fe_2SO_4 \cdot 7H_2O$ | 0.0056 |
| $Na_3PO_4 \cdot 12H_2O$ | 0.20 |
| Sodium formaldehyde sulfoxylate | 0.0169 |

A load of bottles were tumbled at 5° C. in a polymerizer and when about 55% conversion was reached, the stopping agents were injected through a self-sealing synthetic rubber liner in the perforated cap. One bottle was not stopped and served as a control. After injection of stopping agents into the bottles they were tumbled in the polymerizer for one more hour at 5° C. after which the latices were sampled for percent conversion. The bottles were then tumbled in the polymerizer at 50° C. and percent conversion for each bottle was determined after 6 hours and after 24 hours of heating. An effective stopping agent will stop polymerization of the recipe completely even during the extended period of heating at 50° C. for 24 hours.

The following table illustrates the outstanding results obtained with representative hydroquinone tertiary amine oxides when compared to related amine oxide compounds that do not effectively stop polymerization.

| | | | | Percent conversion | | |
|---|---|---|---|---|---|---|
| Example No. | Stopping agent | Concentration, p.h.m. | When stopped | After 1 hr. at 50° C. | After 6 hrs. at 50° C. | After 24 hrs. at 50° C. |
| 1 | None | | 53.8 | 72.7 | 98.0 | 98.2 |
| 2 | Benzyldimethylamine-N-oxide | 0.15 | 53.8 | 68.3 | 98.5 | 96.7 |
| 3 | Benzyldiethylamine-N-oxide | 0.15 | 53.8 | 64.0 | 96.2 | 96.4 |
| 4 | 2-dimethylamino-methylphenol-N-oxide | 0.15 | 53.8 | 54.2 | 74.4 | 77.5 |
| 5 | 2,5-bis(dimethylaminomethyl)hydroquinone-N,N'-dioxide | 0.15 | 53.8 | 58.2 | 54.9 | 54.2 |
| 6 | 2,5-bis(diethylaminomethyl)hydroquinone-N,N'-dioxide | 0.15 | 53.8 | 56.3 | 58.9 | 58.2 |

I claim:
1. In the process of preparing a synthetic rubber latex by emulsion polymerization of conjugated diolefin in aqueous medium containing in admixture a free-radical catalyst and terminating the polymerization by the addition of a stopping agent, the improvement which comprises using as said stopping agent a hydroquinone tertiary amine oxide of the structure

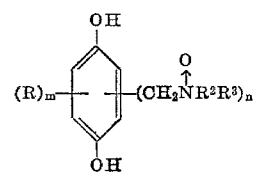

where R is selected from the class consisting of alkyl radicals having one to five carbon atoms, chlorine, bromine, nitro and the group —$(CH_2NR^2R^3)$; $m$ is 0 or 1; $R^2$ and $R^3$ are selected from the group consisting of alkyl radicals having one to five carbon atoms, β-hydroxyalkyl radicals having one to five carbon atoms, and oxydiethylene when $R^2$ and $R^3$ together form a single radical; and $n$ is 1 or 2.

2. The process of claim 1 wherein the polymerization is of butadiene to prepare synthetic rubber latex.

3. The process of claim 1 wherein the polymerization is of butadiene-styrene to prepare synthetic rubber latex.

4. The process of claim 1 wherein the stopping agent is 2,5 - bis(dimethylaminomethyl)hydroquinone - N,N' - dioxide.

5. The process of claim 1 wherein the stopping agent is 2,5 - bis(diethylaminomethyl)hydroquinone - N,N'-dioxide.

6. The process of claim 1 wherein the stopping agent is 2-morpholinomethylhydroquinone-N-oxide.

7. The process of claim 1 wherein the stopping agent is 2,5-bis(morpholinomethyl)hydroquinone-N,N'-dioxide.

8. The process of claim 1 wherein the stopping agent is 2,5 - bis(N-ethyl-N-β-hydroxyethylaminomethyl)hydroquinone-N,N'-dioxide.

9. The process of claim 1 wherein the stopping agent is 2,5 - bis(di - n-butylaminomethyl)hydroquinone-N,N'-dixode.

References Cited

UNITED STATES PATENTS

| 2,687,442 | 8/1954 | Claver | 260—666.5 |
| 3,047,579 | 7/1962 | Witman | 260—666.5 |
| 3,222,334 | 12/1965 | Demme | 260—84.7 |

OTHER REFERENCES

Dumbrook et al.—644 O.G. 622, Mar. 13, 1951.

JAMES A. SEIDLECK, Primary Examiner

U.S. Cl. X.R.

260—84.7, 85.1, 94.6, 94.7